United States Patent [19]

Iwai et al.

[11] Patent Number: 5,367,623
[45] Date of Patent: Nov. 22, 1994

[54] INFORMATION PROCESSING APPARATUS CAPABLE OF OPENING TWO OR MORE WINDOWS ON SCREEN, ONE WINDOW CONTAINING A PAGE AND OTHER WINDOWS CONTAINING SUPPLEMENTAL INFORMATION

[75] Inventors: Toshiyuki Iwai, Tenri, Japan; Kunihiko Iizuka, Bringhton, Mass.; Yumi Yamauchi, Yokohama, Japan; Atsushi Aoki, Katsuragi, Japan; Noboru Kubo, Koriyama, Japan

[73] Assignee: Sharp Kabushiki Kaisha, Osaka, Japan

[21] Appl. No.: 766,484

[22] Filed: Sep. 25, 1991

[30] Foreign Application Priority Data

Sep. 25, 1990 [JP] Japan .................................. 2-254703

[51] Int. Cl.⁵ .............................................. G06F 15/62
[52] U.S. Cl. ........................................ 395/157; 395/161
[58] Field of Search ............................... 395/155–161, 395/148, 700; 340/721–723; 345/901; 364/419.1, 419.17

[56] References Cited

U.S. PATENT DOCUMENTS

| | | | |
|---|---|---|---|
| 4,860,217 | 8/1989 | Sasaki et al. | 340/723 |
| 4,931,783 | 6/1990 | Atkinson | 395/156 |
| 4,962,475 | 10/1990 | Hernandez et al. | 340/721 X |
| 4,974,174 | 11/1990 | Kleinman | 395/156 |
| 5,072,412 | 12/1991 | Henderson, Jr. et al. | 395/159 |
| 5,079,695 | 1/1992 | Dysart et al. | 395/700 |
| 5,140,678 | 8/1992 | Torres | 395/159 |
| 5,155,806 | 10/1992 | Hoeber et al. | 395/157 |
| 5,157,763 | 10/1992 | Peters et al. | 395/157 |
| 5,157,768 | 10/1992 | Hoeber et al. | 395/157 |
| 5,165,012 | 11/1992 | Crandall et al. | 395/157 X |
| 5,230,063 | 7/1993 | Hoeber et al. | 395/15.6 |
| 5,233,687 | 8/1993 | Henderson, Jr. et al. | 395/158 |
| 5,237,651 | 8/1993 | Randall | 395/148 |

OTHER PUBLICATIONS

Tanitawa et al., "Actipedia-Electronic Book", Proc. of the 38th National Meeting, 1989, pp. 1096–1097, English Translation.
FullWrite Professional: A User's Guide, Ashton-Tata Corp., 1988, pp. 99–122.
Hidekazu Tanizawa et al., "Actipedia-Electronic Book (ACTEK)", Information Processing Society, Proceedings (II) of the 38th National Meeting, pp. 1096 to 1097, 1989, Japanese.

*Primary Examiner*—Heather R. Herndon
*Assistant Examiner*—John E. Breene
*Attorney, Agent, or Firm*—David G. Conlin; Robert F. O'Connell; Kevin J. Fournier

[57] ABSTRACT

An information processing apparatus has a capability of opening two or more windows and processing an object such as text, graphics, and a picture on each page. This information processing unit includes a pasting unit for pasting a tag window at any location on each page, a registering unit for registering one or more objects in the tag window, and a linking unit for linking the page to the tag window or unlinking the tag window from the page.

7 Claims, 19 Drawing Sheets

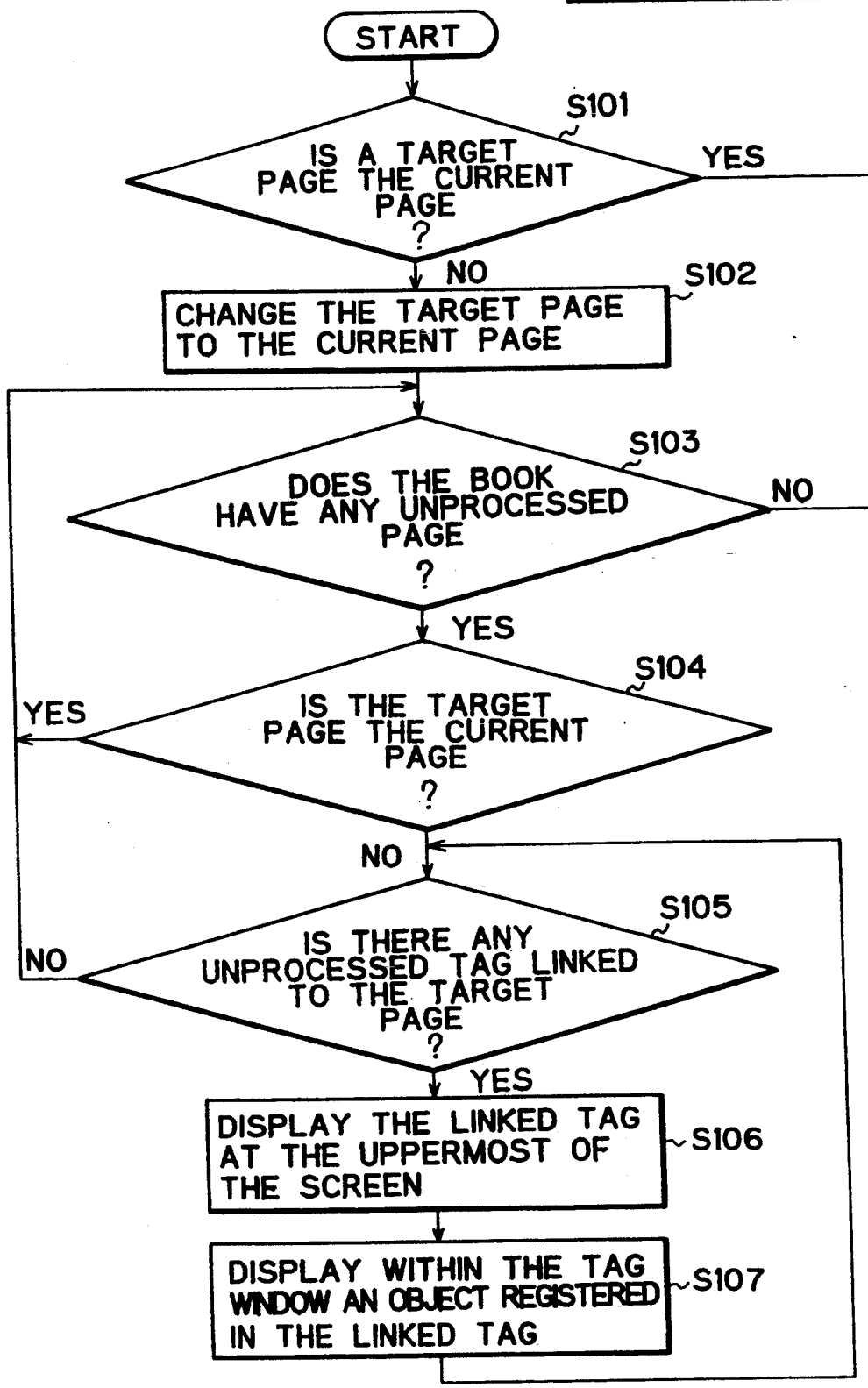

INFORMATION PROCESSING APPARATUS CAPABLE OF OPENING TWO OR MORE WINDOWS ON SCREEN, ONE WINDOW CONTAINING A PAGE AND OTHER WINDOWS CONTAINING SUPPLEMENTAL INFORMATION

BACKGROUND OF THE INVENTION

1. Field of the Invention

The present invention relates to an information processing apparatus which is capable of opening two or more windows on a screen.

2. Description of the Related Art

A book-type information managing system adopting an information processing apparatus capable of opening two or more windows on the screen often provides a tag function by which a page is allowed to be indexed from an electronic book. For example, the present inventors know an information system which is capable of immediately checking a tag-pasted page. The representative system is disclosed in the known reference: Information Processing Society, Proceedings (II) of the 38th National Meeting, pages 1096 to 1097, "Actipedia—Electronic Book (ACTEK)", Hidekazu Tanizawa, et. al.). In this known system, the tag contains as attributes width, height, color, page number to which the tag is attached and as the indexing functions prefixed ones only.

In the known system, however, the tag includes only the indexing functions based on the fixed data stored in the system itself. The tag provides so small an amount of information that an operator has some difficulty in searching a target page, that is, a tag-pasted page or window of an electronic book.

SUMMARY OF THE INVENTION

It is therefore an object of the present invention to provide an information processing apparatus which provides a tag with many functions so that a user can search information from the electronic book in the substantially same manner as from the printed book.

According to an aspect of the present invention, an information processing apparatus having a capability of opening two or more windows on screen and processing one or more objects on each page, includes means for pasting one or more tag windows at any location of each page; means for registering one or more objects in the tag window pasted by the pasting means; and means for linking the page to the one or more tag window pasted on the page.

According to another aspect of the present invention, an information processing apparatus having a capability of opening two or more windows on screen and processing one or more objects on each page, includes means for pasting one or more tag windows at any location of each page; means for registering one or more objects in the tag window pasted by the pasting means; and means for linking the page to the one or more tag windows pasted on the page or unlinking the page from the one or more tag windows depending on the location of the pasted tag window.

According to another aspect of the present invention, an information processing apparatus having a capability of opening two or more windows on screen and processing one or more objects on each page, includes: means for pasting one or more tag windows at any location of each page; means for registering one or more objects in the tag window pasted by the pasting means; means for linking the page to the one or more tag windows pasted by the pasting means; and means for displaying only the non-overlapped portion of the tag window linked to the page if the linked page is partially hidden under another page.

In operation, the information processing system is capable of pasting a tag window to any location of each page of the electronic book and registering any object in the tag window, so that the user can freely register his or her intended object such as a note or graphics at any location of the tag window. Further, this system works to link the tag window to a page based on the location of the pasted tag window. Hence, the system has a capability of processing the information as citing the tag and the page linked to the tag in synchronism as well as of easily linking the tag or unlinking the tag merely by adjusting where the tag window is pasted. In case the page linked to the tag is hidden under an other page, the non-hidden portion of the tag window is allowed to appear on the screen. so that the user can very easily search the pages hidden under the page appearing at the uppermost of the screen (referred to as a current page).

As mentioned above, the present information processing apparatus has a sufficient amount of tag functions so that the user can search or edit the information in the information processing apparatus itself in the same manner as in the printed matters.

Further objects and advantages of the present invention will be apparent from the following description of the preferred embodiments of the invention as illustrated in the accompanying drawings.

DESCRIPTION OF THE PREFERRED EMBODIMENTS

Preferred embodiments of the present invention will be described with reference to the drawings.

Figure 1:
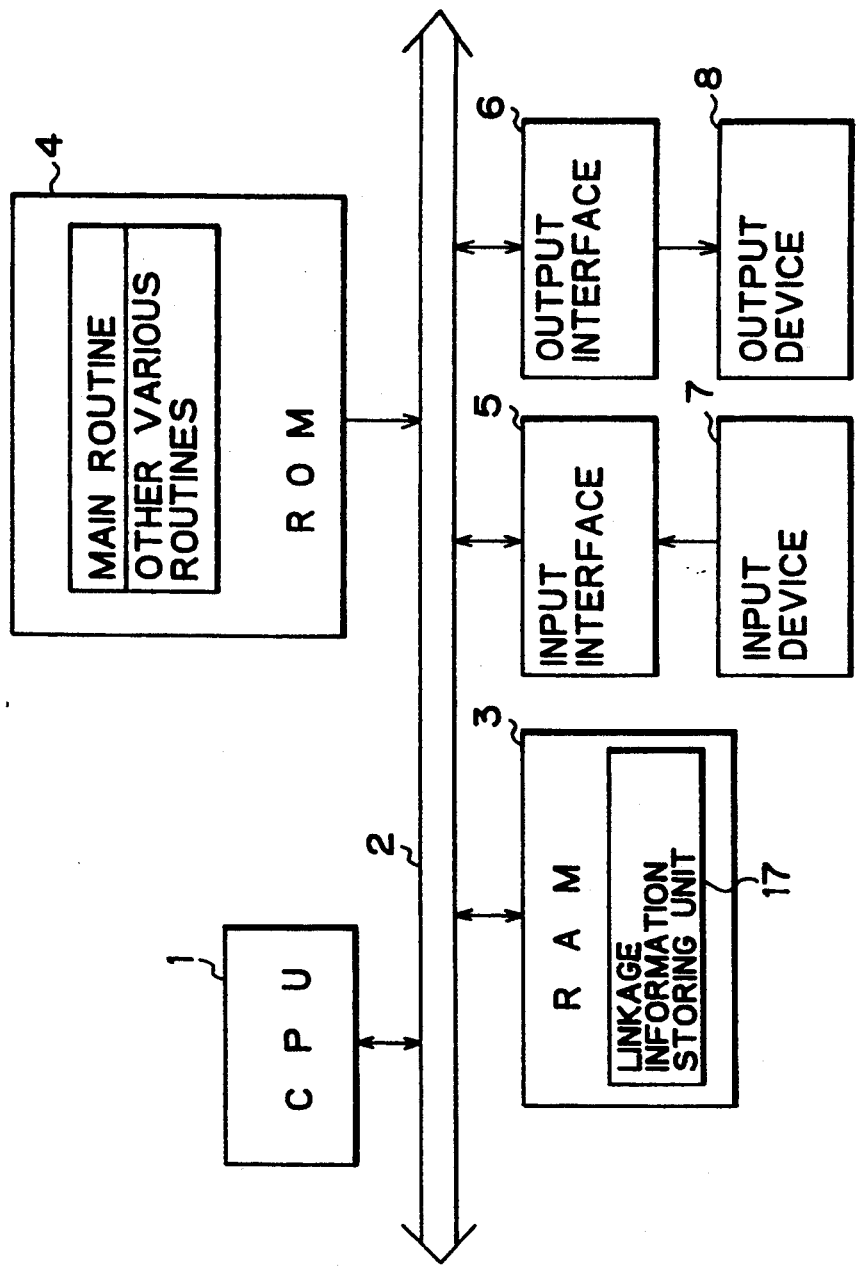
FIG. 1 is a block diagram showing arrangement of a book-type information managing system according to an embodiment of the present invention.

FIG. 1 is a block diagram showing hardware of an information processing apparatus used in a book-type information managing system according to an embodiment of the present invention.

As shown, reference numeral 1 denotes a central processing unit (CPU). The CPU 1 is connected to a random access memory (RAM) 3, a read-only memory (ROM) 4, an input interface 5, and an output interface 6 through a bus 2.

The input interface 5 is connected to an input device 7. The input device 7 is a coordinate input device capable of inputting a coordinate such as a mouse or a tablet or a text input device capable of inputting text. The output interface 6 is an output device 8 such as a high-resolution bit-map display device.

Figure 2:
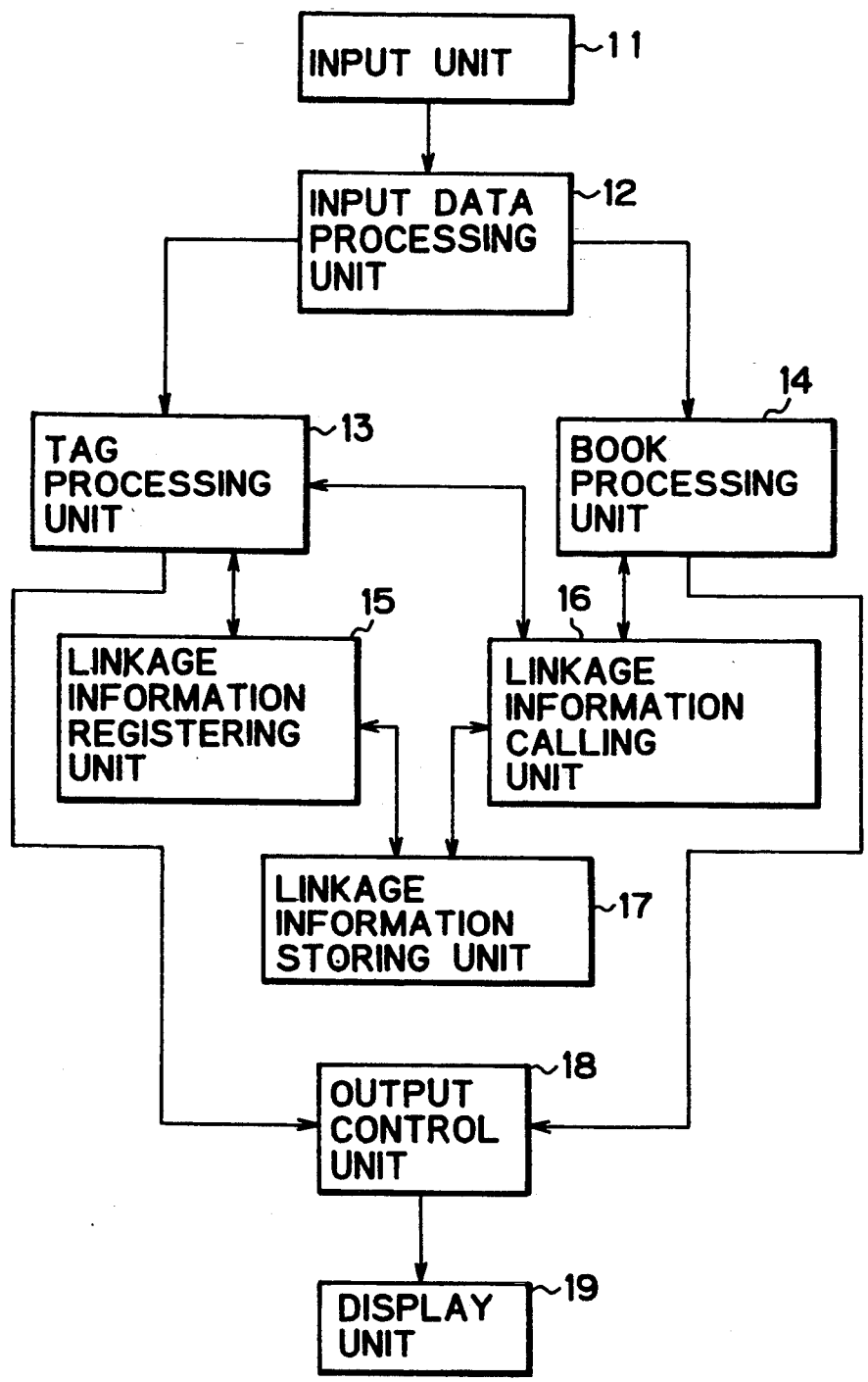
FIG. 2 is a block diagram showing functional arrangement of the book-type information managing system shown in FIG. 1.

FIG. 2 is a block diagram showing functional arrangement of the present embodiment. In actual, this embodiment includes a database unit for storing and managing objects, a control unit for controlling the opening or closing of the windows, and the like. Since, however, those units are included in the foregoing apparatus known by the inventors, the following description will be directed to the units relevant to the advantages of the present invention.

In FIG. 2, reference numeral 11 denotes an input unit composed of the input device 7 and the input interface 5 shown in FIG. 1. The input unit 11 is connected to an input data processing unit 12. This input data processing unit 12 operates to identify the input data from the input unit 11 in addition to the processing of the input data. Identifying the input data means identifying whether the input data concerns with a tag or an electronic book (hereinafter, simply referred to as a book).

The input data processing unit 12 is connected to a tag processing unit 13 and a book processing unit 14. The tag processing unit 13 serves to set a tag window, register an object within the tag window, or establish linkage between the tag window and the page if it is identified that the input data concerns with the tag. By operating the input unit 11, an operator can paste the tag at a target location of a target page in the book. Whether the tag window is linked to the page or the tag window is unlinked depends on the initial location where the tag is pasted. Further, the operator can input and register any object in the tag window.

If it is identified that the input data concerns with the book, the book processing unit 14 operates to register an object in the book, process a book window, turn over pages, or retrieve a target page.

Throughout this specification, an object means any dana treated by the information managing system such as text, graphics, and pictures, a page means a unit at which an object is stored, a book means binding of pages, and a tag stores an object containing additional information to the page.

The tag processing unit 13 is connected to a linkage information registering unit 15 and a linkage information calling unit 16. The linkage information registering unit 15 is connected to a linkage information storing unit 17 formed inside of the RAM 3 shown in FIG. 1. In case the tag processed by the tag processing unit 13 is pasted on a page, the linkage information registering unit 15 operates to register to the linkage information storing unit 17 the linkage information representing the linkage between the tag and the page. The linkage information calling unit 16 is connected to the linkage information storing unit 17 and the book processing unit 14 so as to read from the linkage information storing unit 17 the linkage information as to whether or not the tag processed in the tag processing unit 13 is linked to the page processed by the book processing unit 14.

The tag processing unit 13 and the book processing unit 14 are both connected to an output control unit 18. The output control unit 18 is connected to a display unit 19 is composed of the output device 8 and the output interface 6 shown in FIG. 1. As considering the state of opened windows, the tag and the page processed by the tag processing unit 13 and the book processing unit 14 are displayed on the display unit 19 in a multi-window manner. In the scope of appended claims of the invention, the pasting means is composed of the input unit 11 and the tag processing unit 13, the registering means is composed of the tag processing unit 13, the linking means is composed of the tag processing unit 13, the linkage information registering unit 15, and the linkage information storing unit 17, the means for displaying only the non-overlapped portion is composed of the book processing unit 14 and the display unit 19.

Figure 3:
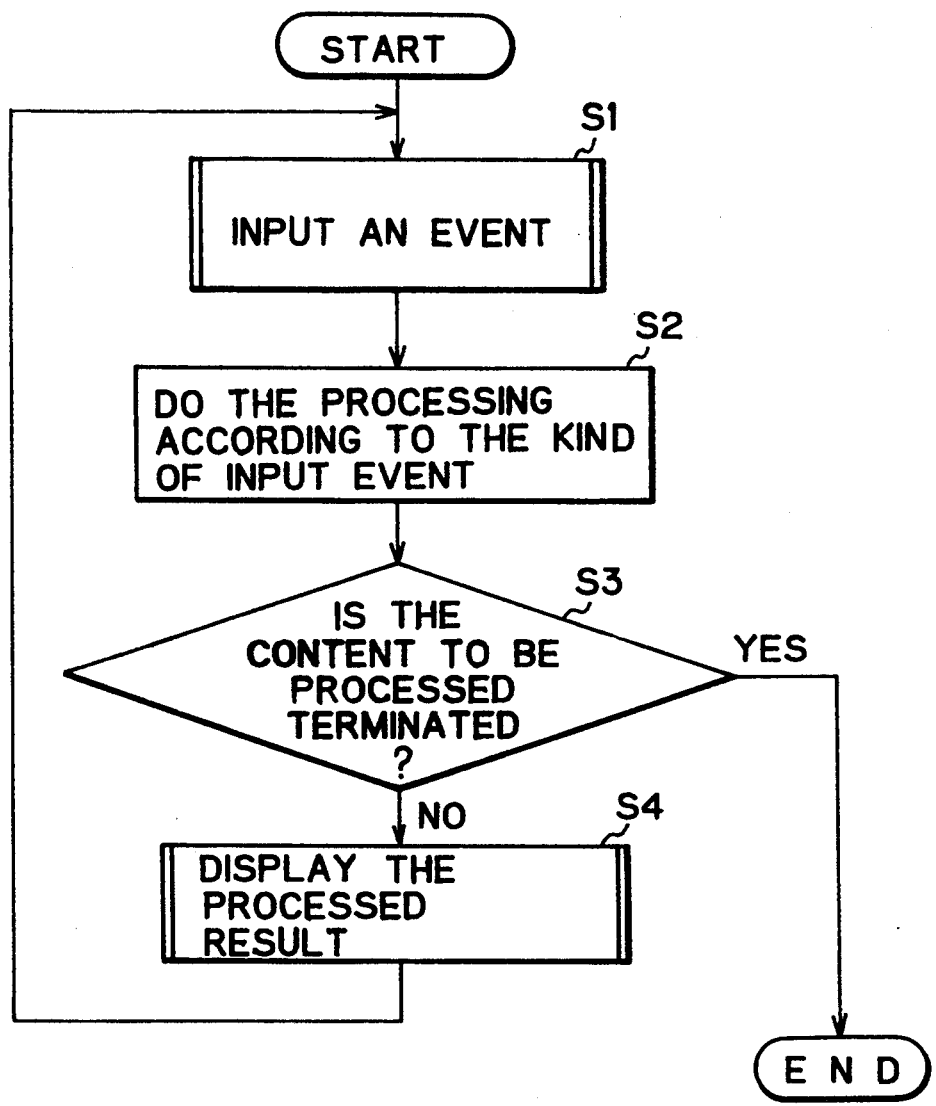
FIG. 3 is a flowchart showing a main routine executed in the book-type information managing system shown in FIG. 1.

In turn, the description will be directed to the program of the present embodiment with reference to FIG. 3.

FIG. 3 is a flowchart showing a main routine of the present information processing apparatus. At a step S1, this information processing apparatus receives an external event input by the input device 7 such as a pointing device or a keyboard or an internal event such as a timer. Then, an a step S2, the processing is carried out according to the input event. At a step S3, it is determined whether or not the content to be processed is terminated. If it is terminated, this main routine is terminated. If the content to be processed is not terminated, the program goes to a step S4 at which the content is output to the output device 8 such as the bit-map display device. Thereafter, this routine is executed in a loop until the content to be processed is determined to be terminated at the step S3.

Next, the description will be directed to each kind of event relevant to this invention and the processing operation corresponding to each kind of event.

Figure 4B:
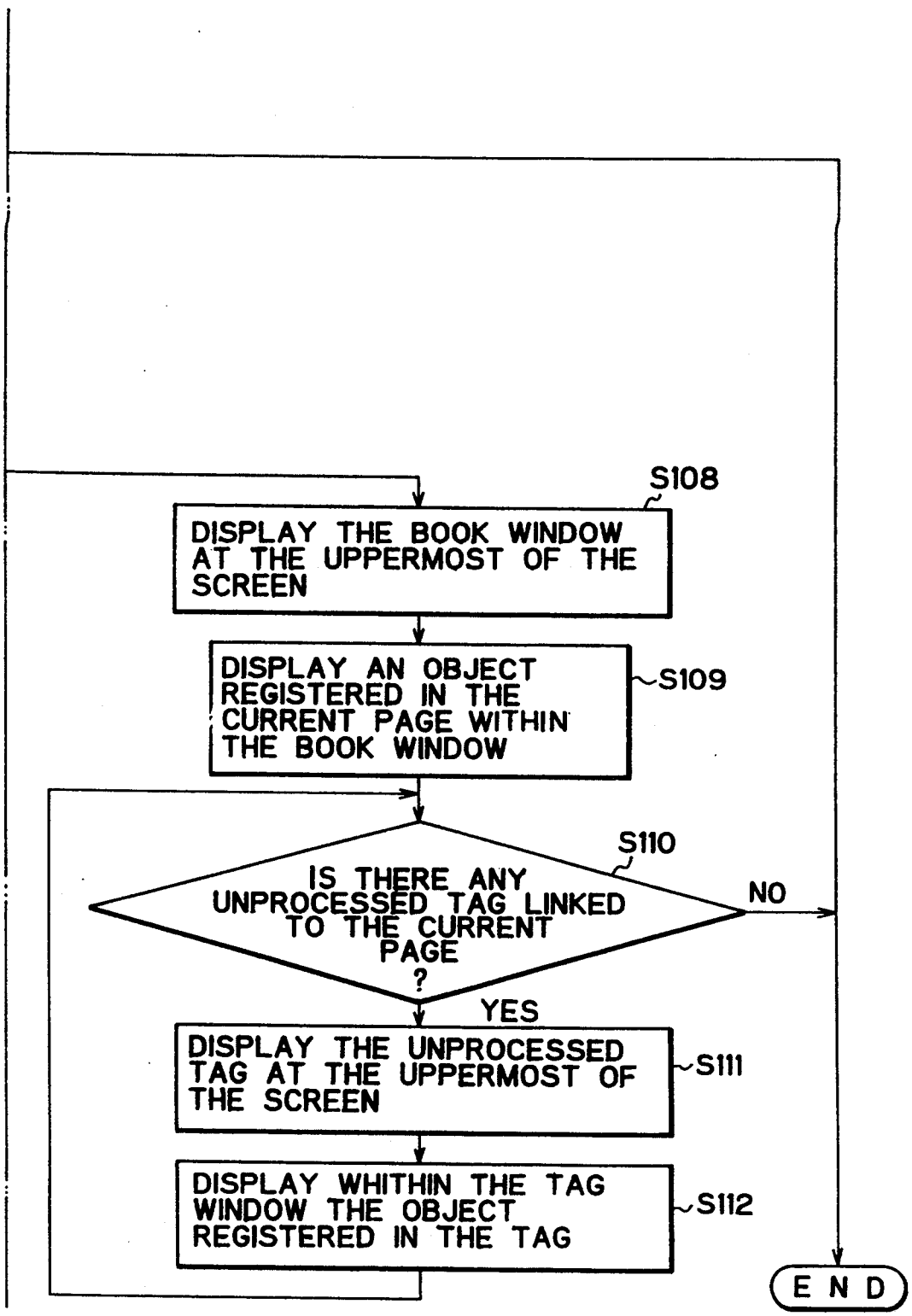
FIG. 4 composed of FIGS. 4A and 4B is a flowchart showing a general page processing routine to be executed in handling a book.

FIG. 4 composed of FIGS. 4A and 4B is a flowchart showing a general page processing routine of the book. This routine is executed if the current page is changed as a result of turning over the pages or the book is required to be displayed or redisplayed as a result of creating, moving, copying and opening a book.

At a step S101, it is determined whether or not the target page is a current page. If yes, this routine is terminated. If not, the program goes to a step S102 at which the target page is changed to the current page.

At a step S103, it is determined whether or not the book has unprocessed pages left therein. If yes, the following steps S104 to S107 are executed iteratively. At a step S104, it is determined whether or not the target page is the current page. If yes, the program returns to the step S103. If not, the program goes to a step S105 at which it is determined whether or not any unprocessed tag is linked to the target page. As long as any unprocessed tag is left, the processing at steps S106 and S107 are iteratively executed. At the step S106, the unprocessed tag window is displayed at the uppermost of the screen. Then, at the step S107, the object registered at the tag is displayed on the tag window. This is the processing at the steps S106 and S107 with respect to all the tags linked to the target page.

At the step S103, if it is determined that all the pages contained in the book have been processed, the program goes to a step S108 at which the book window is displayed at the uppermost of the screen. Then, at a step S109, the object registered in the current page is displayed in the book window.

Proceeding to a step S110, it is determined whether or not any unprocessed tag is linked to the current page. As long as any unprocessed tag is left, the processing at steps S111 and S112 is executed iteratively. At the step S111, the unprocessed tag window is displayed at the uppermost of the screen. Then, at the step S112, the object registered to the tag is displayed in the tag window. This is the processing of the steps S111 and S112 with respect to all the tags linked to the current page.

In the foregoinging processing routine, to represent how the book is overlapped with the tags linked to each page of the book, the book window and the tag windows are handled according to the following procedure.

(1) Locate the tag windows liked to the pages except the new current page at the uppermost of the screen.
(2) Locate the book window displaying the content of the new current page at the uppermost of the screen.
(3) Locate the tag windows linked to the new current page at the uppermost of the screen.

The handling operation results in making it possible to display only the non-overlapping portions of the tags linked to the pages except the current page and display the tag linked to the current page on the book.

Figure 5:
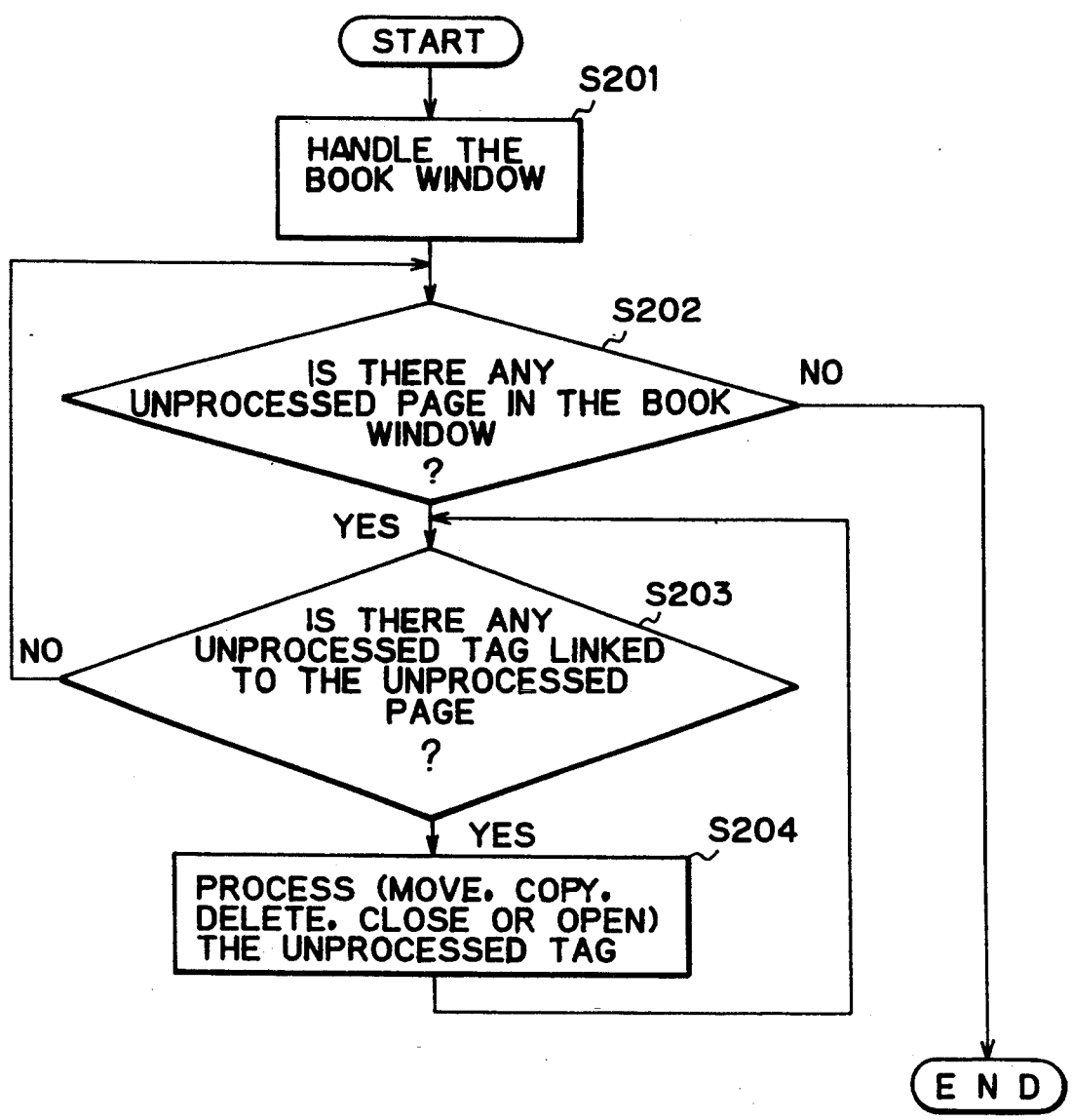
FIG. 5 is a flowchart showing a routine to be executed in handling the book.

FIG. 5 is a flowchart showing a handling routine about the book. This routine works so that the handling operation of the book is succeeded to the tag linked to each page of the book.

At a step S201, the program receives the handling operation of the book window such as moving, copying, deleting, and opening or closing the window. Proceeding to a step S202, it is determined whether or not any unprocessed page is left in the book. As long as any unprocessed page is left, the processing at steps S203 and S204 is executed iteratively. If all the pages of the book are processed, this handling routine is terminated. At the step S203, it is determined whether or not any unprocessed tag is linked to the target page. As long as any unprocessed tag is left, the processing at the step S204 is executed. At this step S204, the processing of the tag is executed depending on the input handling operation of the book window. For example, in case the moving operation of the book window is input to the program, the tag linked to the page is moved similarly as the book window is relatively moved depending on the moving operation. In case the copying operation of the book window is input to the program, the tag linked to the target page of the book is copied so that the copied tag is placed at the same relative location of the copied book window. That is, the same linkage information is set to the new book window. In case the deleting operation of the book window is input to the program, the tag linked to the page is also deleted. That is, the linkage information is deleted together with the book window. In case the book window is closed, the tag windows linked to the page of the book disappears on the screen similarly as the book window disappears. In case the book icon is opened, the tag windows linked to the pages of the book appears on the screen similarly as the book window appears.

After terminating the routine shown in FIG. 5, the windows are displayed on the screen by the routine shown in FIG. 3 through the routine shown in FIG. 4.

Figure 6:
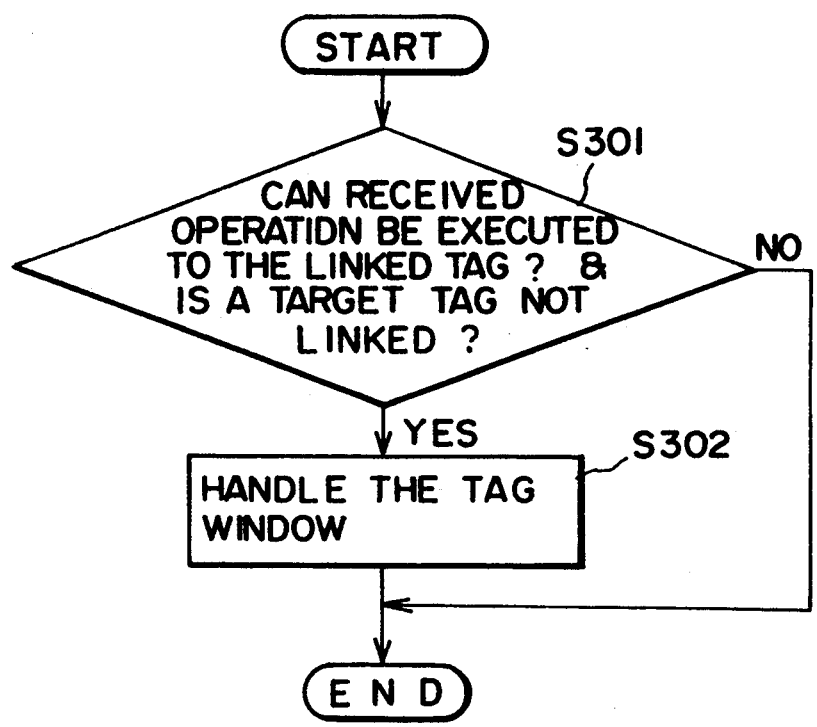
FIG. 6 is a flowchart showing a routine to be executed for a tag depending on whether or not the tag is linked to a page.

FIG. 6 is a flowchart showing a routine for performing the difference processing about the tag depending on whether or not the tag is linked to the page. In case of performing some operations such as moving, copying and deleting with respect to the tag, if the tag is not linked to the page, the operation is executed. However, if the tag is linked to the page, no operation is executed. This is because the tag linked to any page is considered to be integrated with the book and cannot be solely operated. In addition, the operation unconcerned with the linkage between a tag and a page such as registered an object to the tag or deleting an object from the tag is executed irrespective of whether or not the tag is linked to a page.

At a step S301, is is determined whether or not the received operation can be executed to the linked tag and whether the target tag is not linked. If the operation can be executed to the linked tag or the target tag is not linked, proceeding to a step S302, the operation of the tag window is executed. In the other case, this routine is terminated without performing the operation of the tag window.

Figure 7:
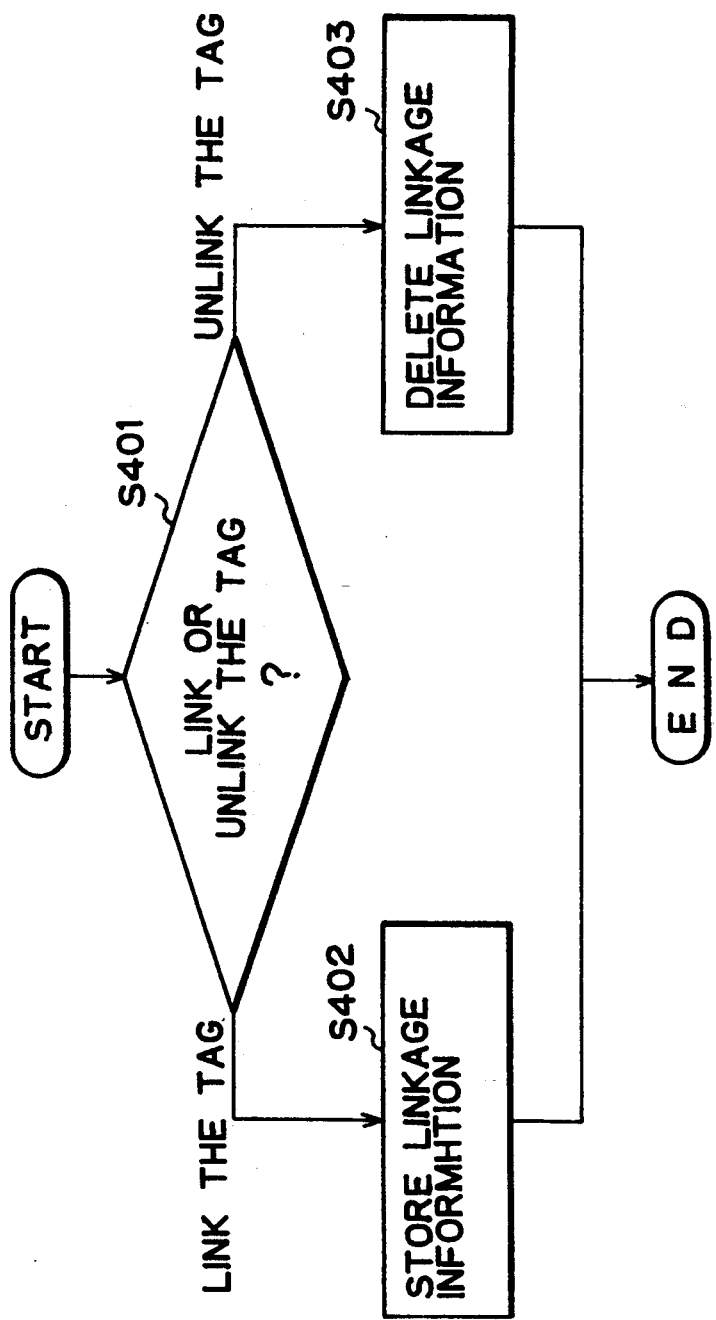
FIG. 7 is a flowchart showing a routine for managing linkage information.

FIG. 7 is a flowchart showing a routine for managing the linkage information.

At a step S401, it is determined whether or not the content to be processed concerns with setting the link (linking processing) or releasing the link (unlinking processing). If it concerns with the linking processing, the program goes to a step S402 at which the linkage information is stored. The linkage information contains a target tag, a target book, a tag-pasted page, and a relative locational relation between the book window and the tag window. Then, this routine is terminated. If it concerns with the unlinking processing, the program goes to a step S403 at which the linkage information is deleted. Then, this routine is terminated.

Figure 8:
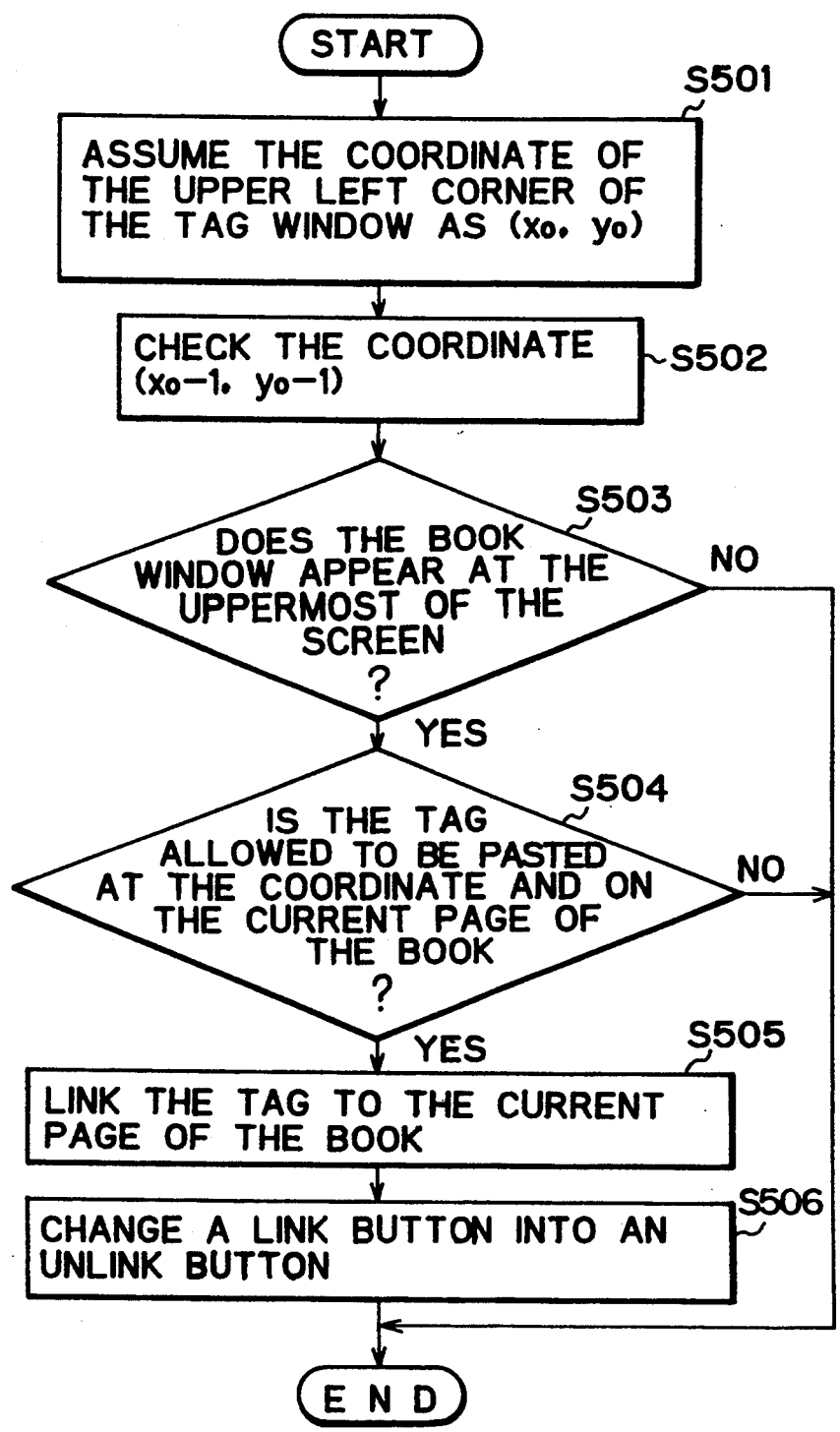
FIG. 8 is a flowchart showing a routine to be executed in handling a link button provided in a tag.

FIG. 8 is a flowchart showing the routine executed in handling a link button of a tag. In FIG. 8, assume that the link button is located at an upper left corner of the tag window.

At a step S501, assume that the coordinate at the upper left corner of the tag window is $(x_0, y^0)$. Proceeding to a step S502, it is checked which window is located at the uppermost of the screen with respect to the coordinate ($x_0-1$, $Y_0-1$) which results from the coordinate ($x_0$, $y_0$) shifted to the upper left by (1.1) only. This is executed to easily retrieve the uppermost window under the tag at the location of the link button.

At a next step S503, it is determined whether or not the window at the uppermost of the coordinate ($x_0-1$, $Y_0-1$) is a book window. If it is not a book window, this routine is terminatd. If it is book window, the program goes to a step S504 at which it is determiend whether or not the tag is allowed to be pasted at the coordinate ($x_0-1$, $Y_0-1$) of the book window and a tag is allowed to be pasted on the current page of the book. If not, this routine is terminated. If it is, the program goes to a step S505 at which the tag is linked to the current page of the book. It results in registering the linkage information through the effect of the linkage information managing routine. Proceeding to a step S506, the link button is changed to the unlink button. Then, this routine is terminatd.

The foregoing processing results in displaying the tag at the location of the link/unlink button as if the tag is pasted on the open page of the book.

Figure 9:
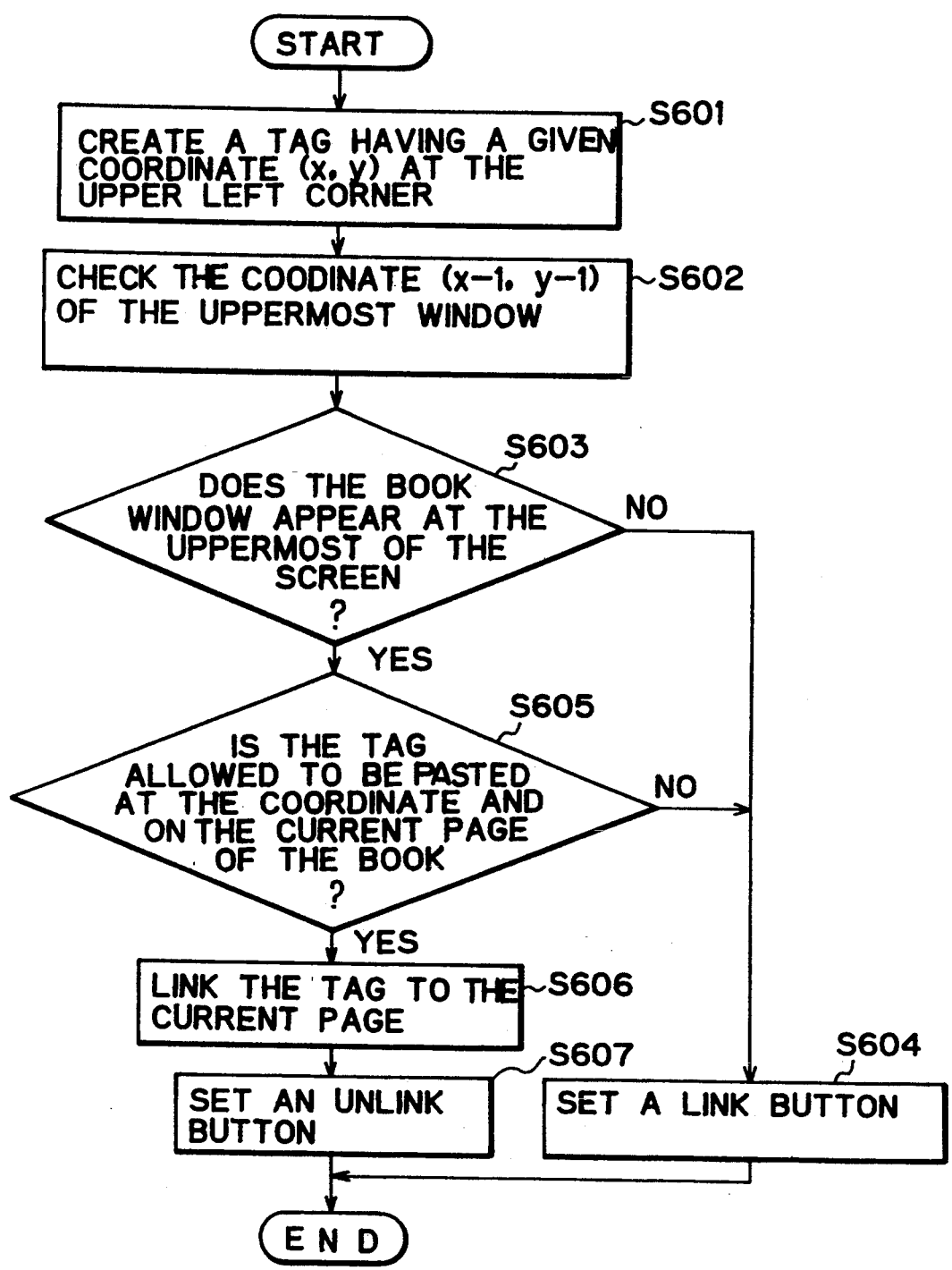
FIG. 9 is a flowchart showing a routine for creating a new tag.

FIG. 9 is a flowchart showing a routine for creating a new tag.

At a step S601, a tag window is newly created. This tag window has the coordinate (x, y) of a given initial location at the its upper left corner. Based on this initial location (x, y), the initial state of the linkage of the tag to the page is defined. That is, like the routine shown in FIG. 8, at a next step S602, it is checked which window is located at the uppermost of the screen at the coordinate ($x-1$, $y-1$). This coordinate ($x-1$, $y-1$) results from the initial coordinate (x, y) shifted to the upper left side by (1, 1).

Proceeding to a step S603, it is determined whether or not the window at the uppermost location of the coordinate ($x-1$, $y-1$) is a book window. If it is not, the program goes to a step S604 without setting the linking relation. At the step S604, the link button (display) is set and then this routine is terminated. If it is a book window at the step S603, the program goes to a step S605 at which it is determined whether or not the tag is allowed to be pasted at the coordinate ($x-1$, $y-1$) of the book window and a tag is allowed to be pasted on the current page of the book. If not, the program goes to a step S604. If yes, the program goes to a step S606 at which the tag is linked to the current page of the book. As a result, the linkage information is registered in the linkage information managing routine shown in FIG. 7. Then, at a step S607, the unlinked button is set (displayed) and then the routine is terminated.

The tag created by the foregoing operation is represented by a window having the coordinate (x, y) of the initial location at the upper left corner. At the upper left corner of the window, the unlinked button is displayed if the linkage is done or the link button is displayed if no linkage is done.

Figure 10:
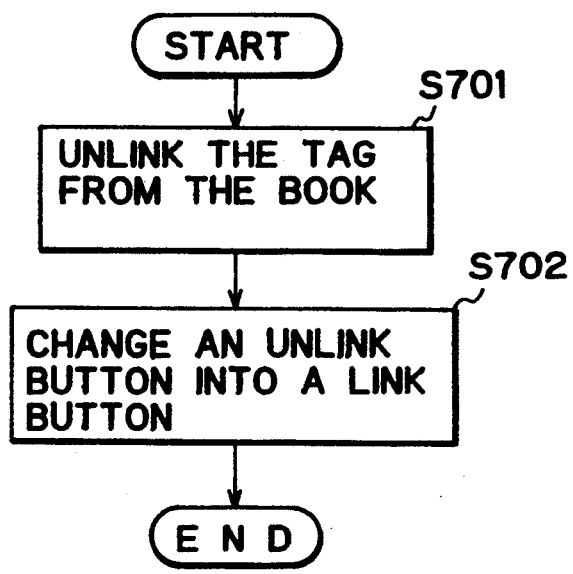
FIG. 10 is a flowchart showing a routine to be executed in handling an unlink button provided in a tag.

FIG. 10 is a flowchart showing a routine to be executed in handling the unlink button of the tag.

At a step S701, the linkage information between the tag and the book is deleted by the routine shown in FIG. 7 (unlinking processing). At a next step S702, the unlink button is changed to the link button. Then, this routine is terminated.

Figure 11:
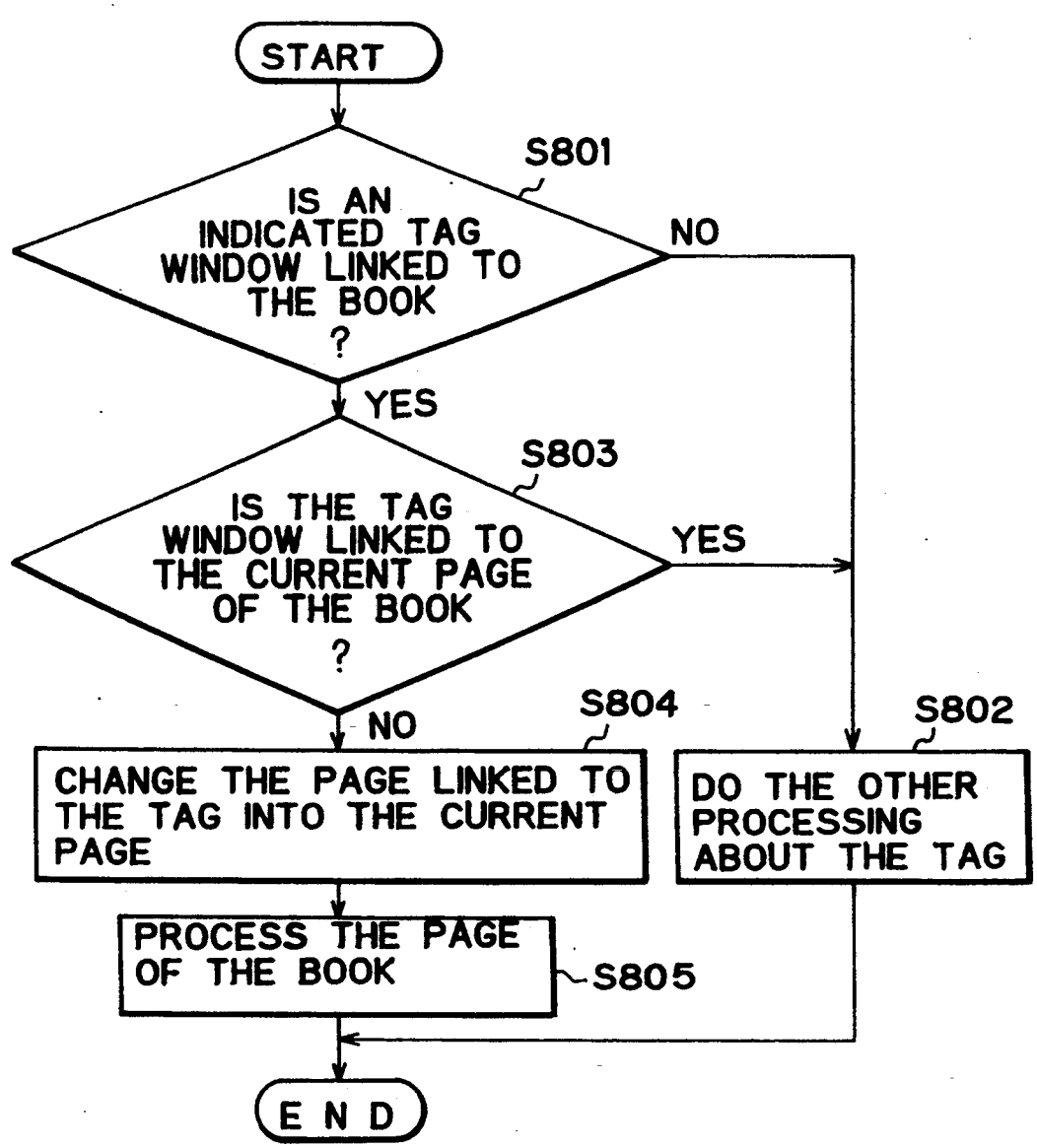
FIG. 11 is a flowchart showing a routine to be executed in retrieving a page by using the tag linked to a page.

FIG. 11 is a flowchart showing a routine for retrieving a page by using a tag linked to the book.

At a step S801, it is determined whether or not the user-pointed tag is linked to the book. If not, the program assumes that the pointed indication means the operation except the page retrieval (for example, registration of an object) and goes to a step S802 at which the other processing is executed. Then, the routine is terminated.

If, at the step S801, it is determined that the tag is linked to the book, the program goes to a step S803 at which it is determined whether or not the page linked to the tag is a current page. If it is a current page, the program goes to the step S802 and, if not, to a step S804. At this step, the page linked to the indicated tag is changed to the current page of the book. Proceeding to a step S805, the page processing of the book is executed through the effect of the routine shown in FIG. 4, and then the routine is terminated.

FIGS. 12 to 16 are explanatory views showing display examples of a display unit 19 according to the present embodiment of the invention.

Figure 12:
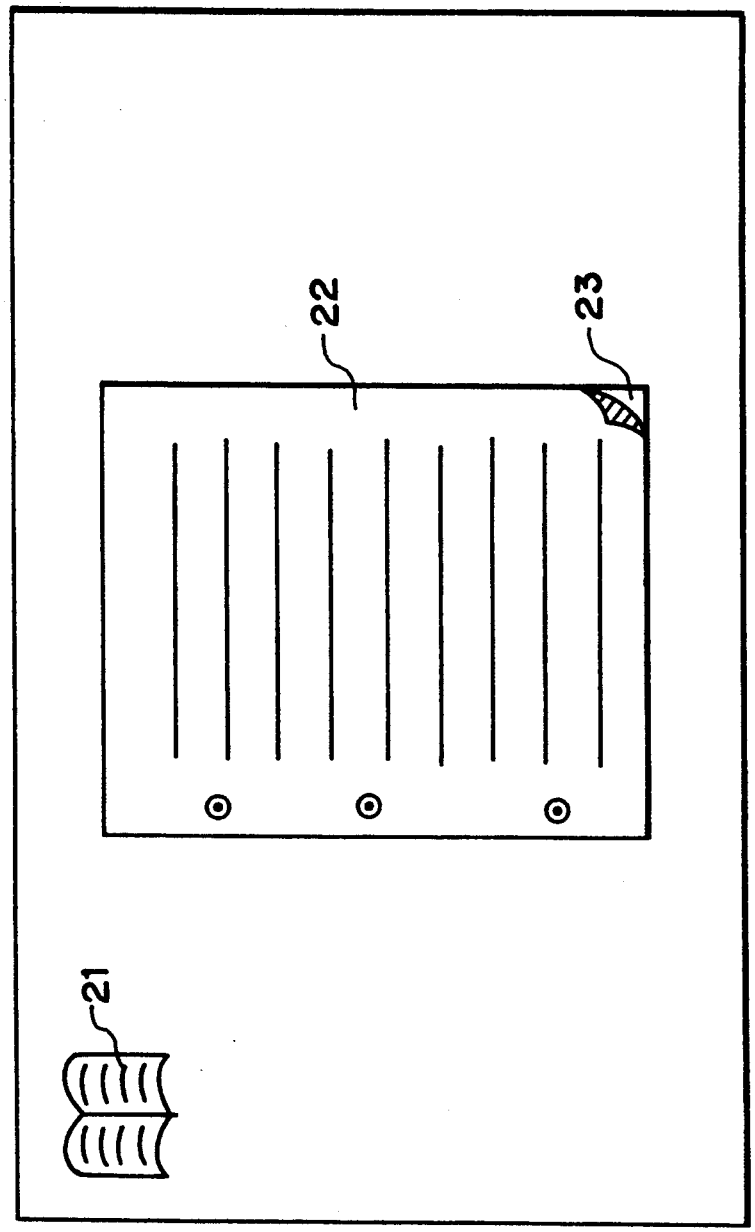
FIG. 12 is an explanatory view showing a display example of a display unit included in the present embodiment.

FIG. 12, shows the screen of the display unit 19 in which the book is opened and the object stored in the book is displayed at each page unit. On the screen, there are displayed an icon 21 showing the book is open, an opened page 22 in the window, and a button 23 by which the page 22 is turned over. The button 23 is pointed by the pointing device, that is, the input unit 11.

Figure 13:
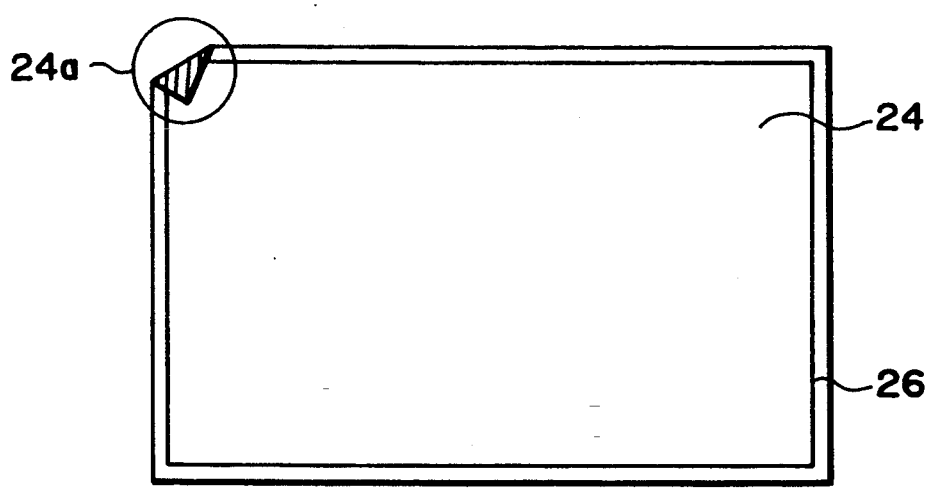
FIG. 13 is an explanatory view showing a display example of the display unit included in the present embodiment.
Figure 14:
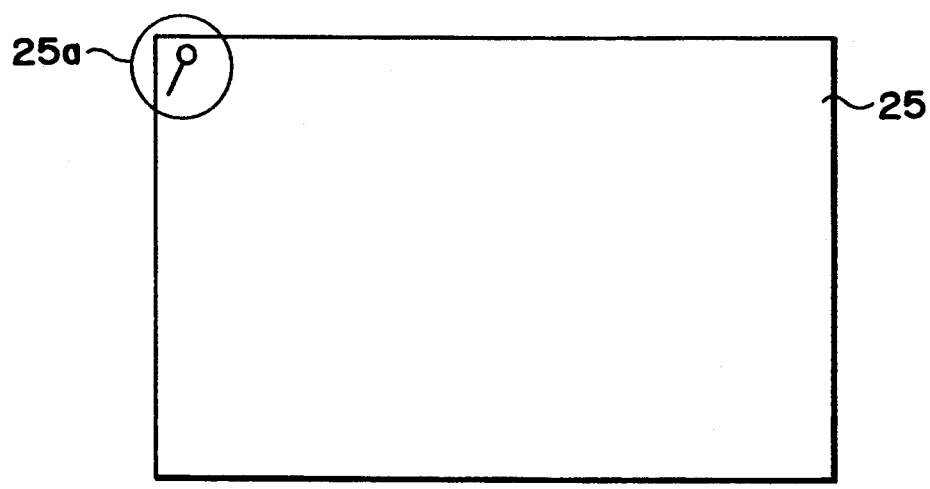
FIG. 14 is an explanatory view showing a display example of the display unit included in the present embodiment.

FIGS. 13 and 14 show a tag window appearing on the display unit 19 in a multi-window manner. FIG. 13 represents that tag window 24 which is not linked to the page. At the corner, a link button 24a is shown. By pointing to this link button 24a, this tag can be linked to any page. 26 denotes an area used for moving the tag window. With the area 26 being pointed and dragged the tag window can be moved. FIG. 14 shown the tag window 25 which is linked to a page. At the corner, an unlinked button 25a is shown. By pointing to this unlinked button 25a, the tag window is unlinked from the page.

Figure 15:
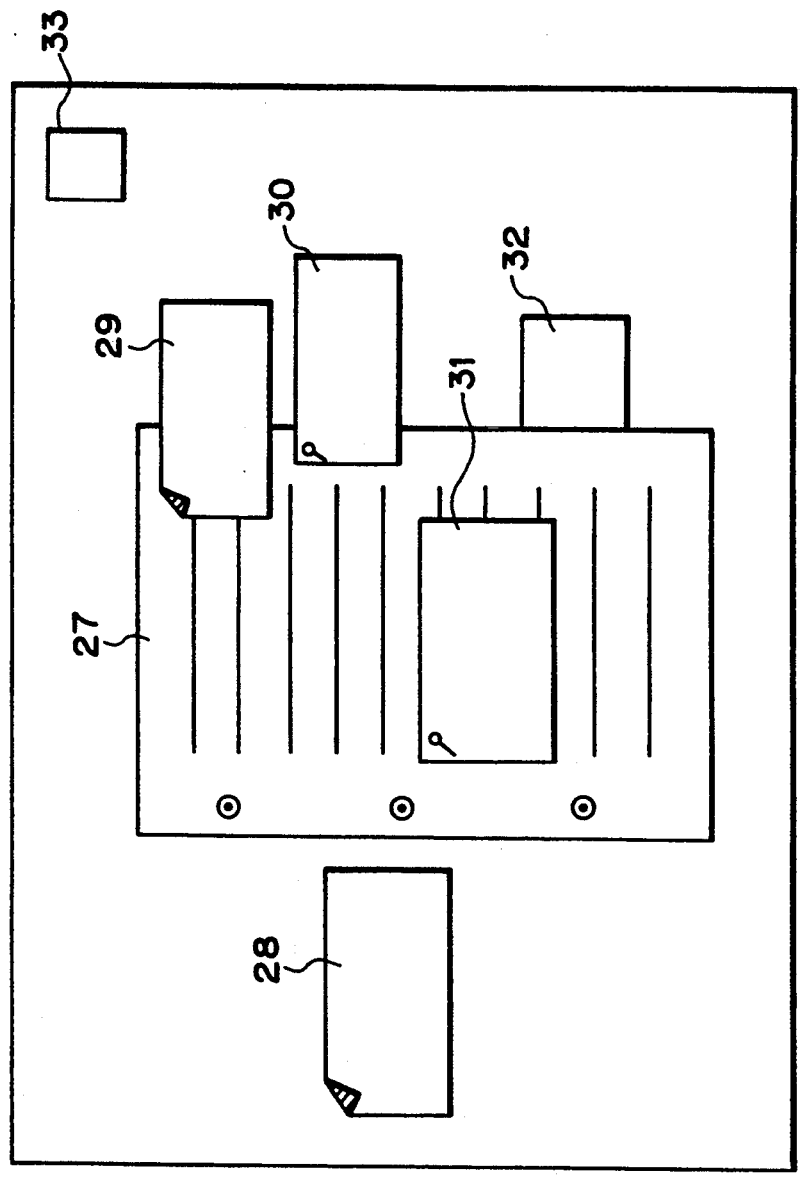
FIG. 15 is an explanatory view showing a display example of the display unit included in the present embodiment.

FIG. 15 shows the screen on which a page 27 and some tag windows 28 and 32 are opened. On this screen, the tag windows 28 and 29 are not linked to any page and the tag windows 30 and 31 are linked to the page 27. The tag window 32 is linked to a page behind the page 27. In addition, 33 denotes a button used for setting a new tag. By pointing to the button 33, the new tag is created.

Figure 16:
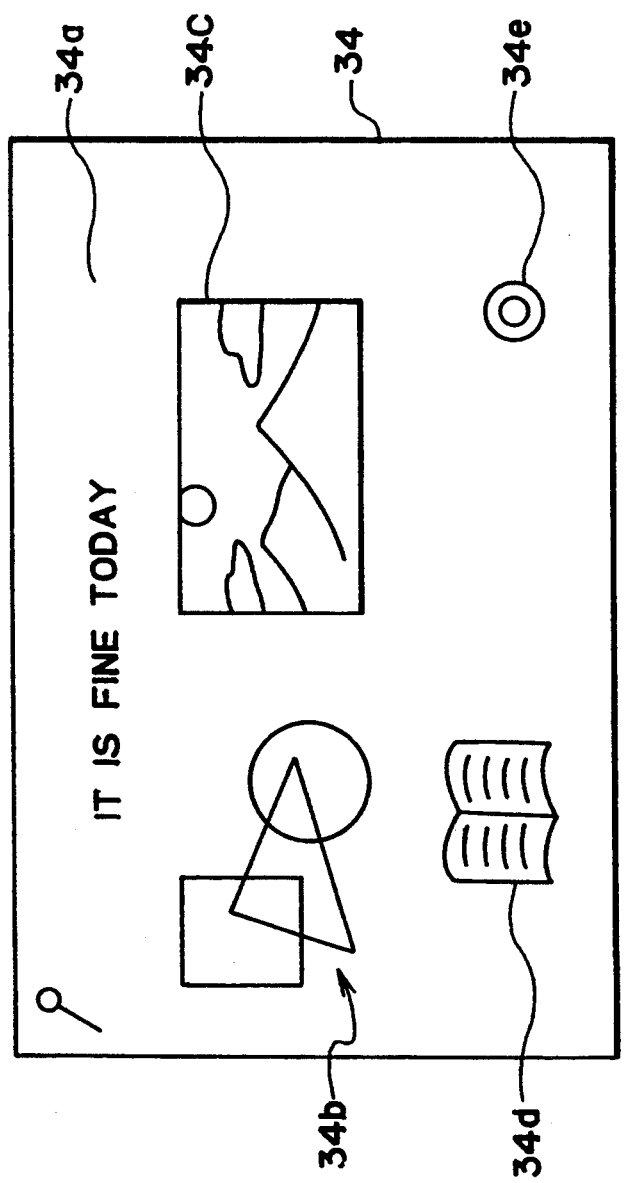
FIG. 16 is an explanatory view showing a display example of the display unit included in the present embodiment.

FIG. 16 shows an example of a tag window 34 in which various objects 34a to 34e are registerd. As shown, it is possible to register character data 34a, graphic data 34b, and image data 34c, an icon 34d, and a button 34e in the tag window.

The description will be directed to the method for registering those objects at any location of the tag window 34.

As described above, the present information processing apparatus has a page specified as a unit of a place for registering an object. The book is a collection of pages. The tag is also a representing means having a single page. Hence, if an object is allowed to be registered to any page of the book, it is allowed to be registered in the tag window as well. For registerein an object, it is possible to employ, for example, the following method.

(1) Moving or Copying

Select an object contained in the book, point to a selective location inside of the tag window, move or copy the object to the location.

(2) Creating an object on the tag window

Place a cursor on the tag window and input taxt throught the cursor. Or, set a depict mode at which the dragged trace is left on the page as dragging a graphic.

Next, the operation of this embodiment will be described along the functional block diagram of FIG. 1.

Assume that the display state shown in FIG. 12, that is, that the book is opened and the object stored in the book is displayed at a page unit. In this state, by pointing to the button 23 with the pointing device (input unit 11), the book processing unit 14 reads out an object of the next page and displays the object of the next page as if the pages are turned over.

In this state, to past a non-use tag, with the pointing device, the user points to the tag creating button 33 and specifies an initial location of the tag window. In case the initial location of the tag window is located on the book, the tag processing unit 13 recognizes that this tag window is to be linked to the book and displays the tag window 30 or 31 pasted on the page 27 on the display unit 19. (see the routines shown in FIGS. 9 and 3). On the other hand, in case the initial location of the tag window is not located on the book, the tag processing unit 13 recognizes that the tag window is not linked to the book and displays the tag window 28 not pasted on the page 27 on the display unit 19 (see the routines shown in FIGS. 9 and 3).

In order to link the unlined tag window to the displayed page 27, drag the tag window 24 as pointing to the square area 26 with the pointing device so that the link button 24a is overlapped on the page 27. Then, the user points to the link button 24a with the pointing device. With this operatin, the tag processing unit 13 operates to set the linkage between the tag window 24 and the page and register the linkage in the linkage information storing unit 17 (see the routines shown in FIGS. 7 and 8). In this state, the unlink button 25a is displayed as shown in FIG. 14. The operations such as moving, copying, deleting, and opening or closing an icon are succeeded from the page 27 to the tag window linked to the page 27. Hence, the book processing unit 14 serves to process the tag window 25 with the page linked thereto (see the routine shown in FIG. 5).

In order to unlink the tag window from the displayed page 27, the user should point to the unlink button 25a with the pointing device. With this operation, the tag processing unit 13 operates to unlink the tag window from the page 27 and make the link button 24a appear on the tag window. As a result, the operations such as moving, copying deleting, and opening or closing an icon are unlinked from the displayed page 27 (see the routines shown in FIGS. 5, 7 and 10).

The objects such as text data 34a, graphic data 34b, image data 34c, an icon 34d, and a button 34e as shown in FIG. 16 are allowed to be freely registered by inputting those objects in the tag window through the input unit 11.

By pointing to the button 23 shown in FIG. 12 with the pointing device, the displayed page 27 is turned over and the next page is displayed. That is, the book processing unit 14 and the linkage information calling unit 16 operate to read the linkage information relevant to the page from the linkage information storing unit 17 and display the tag window linked to the next page and the objects contained in the tag window together with the page. However, the tag window 31 shown in FIG. 15, that is, the tag window having no linkage to the page and no projected portion out of the page, is visually hidden under the page. The non-overlapped portion of the tag window 32 linked to the hidden other pages appear on the screen (see the routine shown in FIGS. 3 and 4).

In case of displaying the page 27, by pointing to the tag window 32 linked to the other page hidden under the page 27 with the pointing device, the book processing unit 14 and the linkage information calling unit 16 operate to retrieve the page linked to the tag window 32 and display the page on the display unit 19 (see the routines shown in FIGS. 3, 4 and 11).

Figure 17:
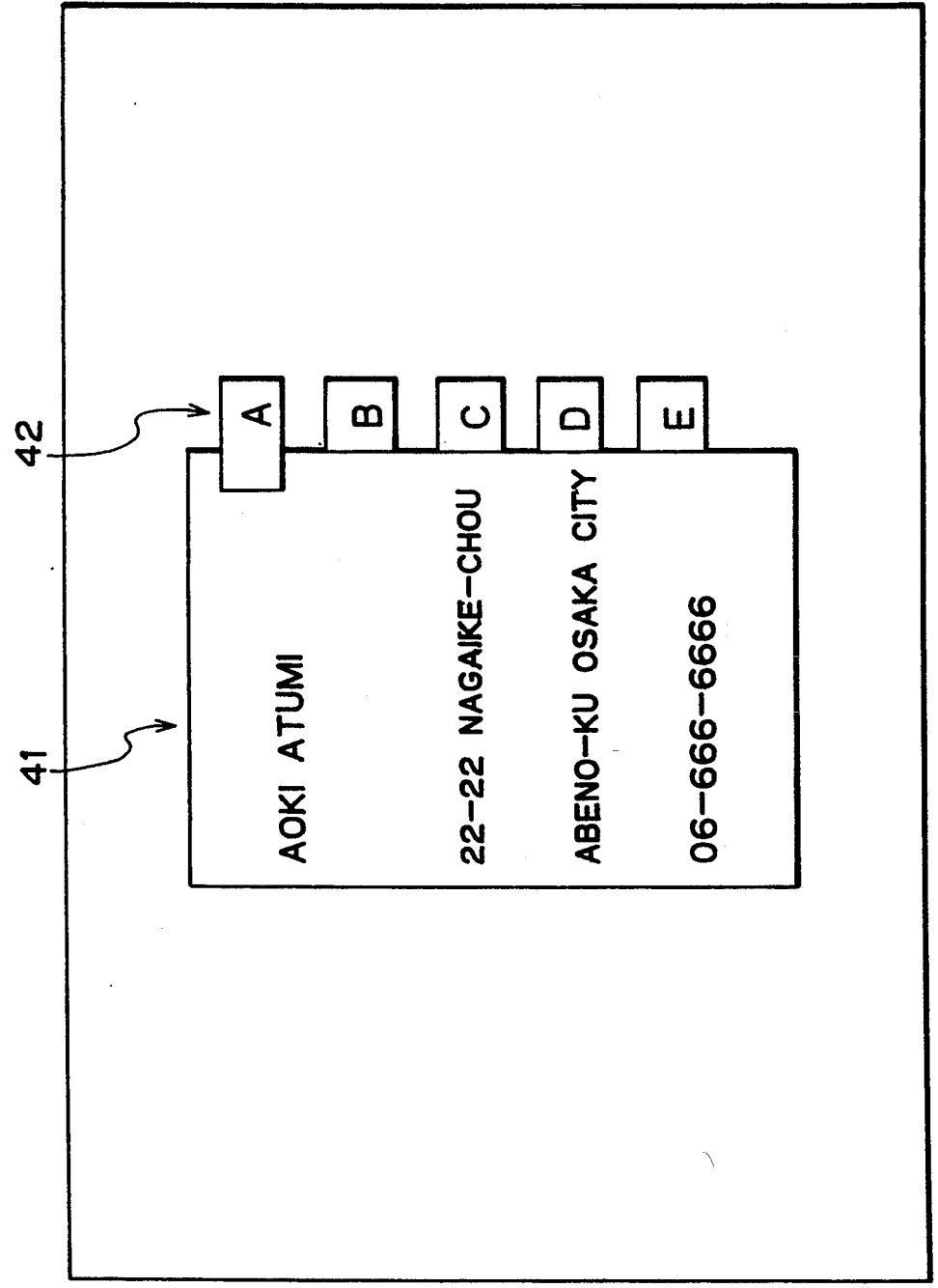
FIG. 17 is an explanatory view showing a display example of a display unit included in another embodiment.

According to another embodiment shown in FIG. 17, it is possible to register any object in each tag window 42 in the state of linking each tag window 42 to the page 41. The relation of linkage between the tag window and the page is stable given by the system. If the linked page is partially or wholly hidden under the other page, only the non-overlapped portion of the tag window linked to the hidden page appears on the screen.

Figure 18:
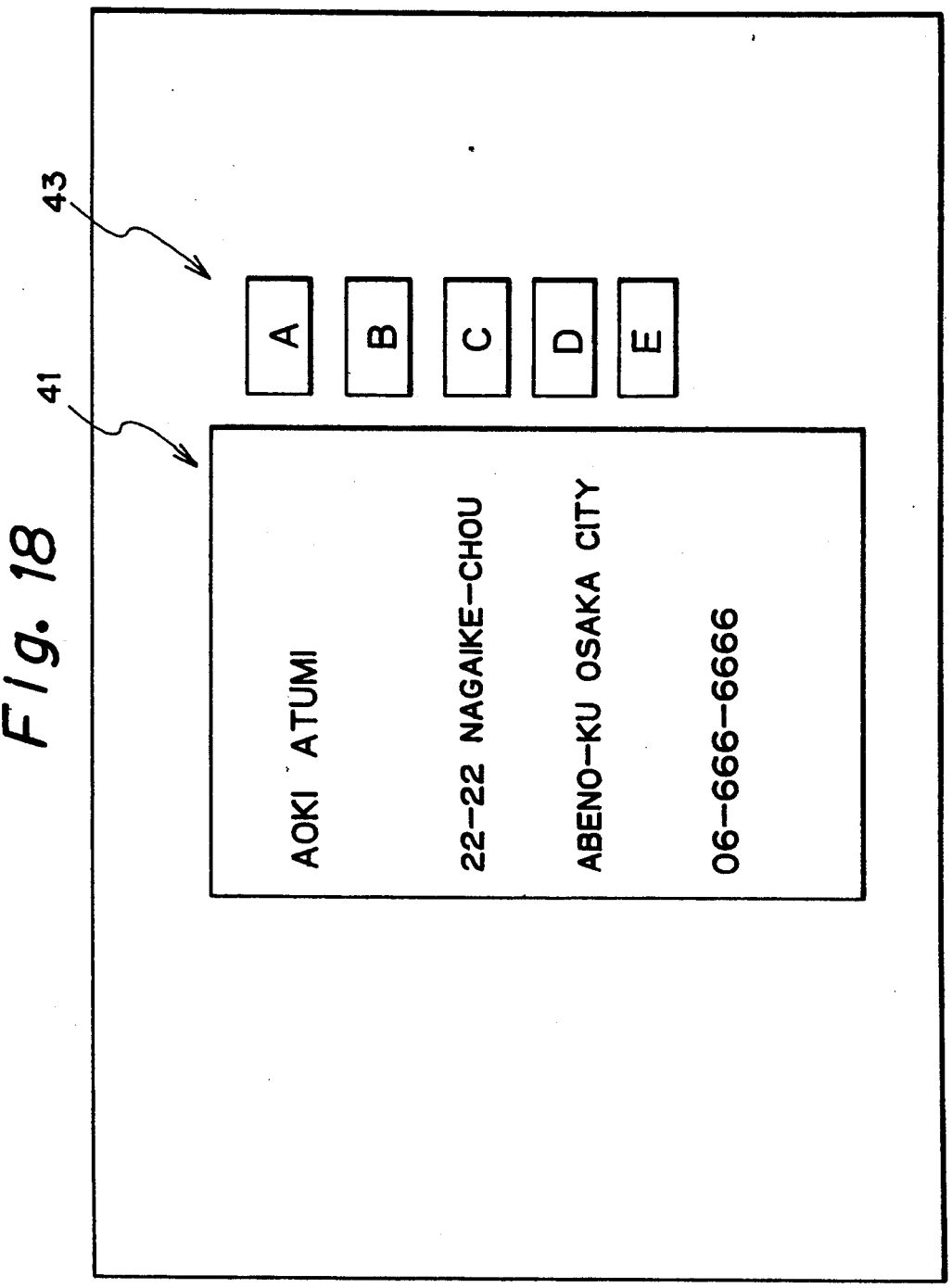
FIG. 18 is an explanatory view showing a display example of a display unit included in another embodiment.

FIG. 18 shown transformation of the embodiment shown in FIG. 17. The tag windows 43 are displayed in a multi-window manner so that the tag windows 43 except the target tage window are not overlapped with the page 41.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information processing apparatus which opens two or more windows on a screen, at least one window displaying a page of information, and processes one or more objects on each page, comprising:

means for pasting one or more tag windows at any location of each page;

means for registering one or more items of supplemental information, supplemental to information contained on a page, in said tag window pasted by said pasting means;

means for linking said page to said one or more tag windows pasted on said page;

an input means for receiving input data from an input device;

an input data processing means for identifying whether the input data concerns said tag window or a book composed of two or more pages;

a tag processing means for setting said tag window, registering one or more items in said tag window, and linking said tag window to said page if said input data processing means determines that said input data concerns said tag window;

a book means for registering one or more objects in said book, processing a page, turning over the pages composing said book, and retrieving a target page;

a linkage information registering means for registering linkage information about a relation between a tag and a tag-pasted page in a linkage information storing means;

a linkage information calling means for calling linkage information between the tag and the tag-pasted page from the linkage information storing means;

the linkage information storing means for storing said linkage information;

an output control means for controlling image output on screen; and a display means for selectively displaying pages and tag windows on screen.

2. An information processing apparatus according to claim 1, wherein said input means and tag processing means composes said pasting means, said tag processing means composes said registering means, and said linking means composes said tag processing means, linkage information registering means, and linkage information storing means.

3. An information processing apparatus which opens two or more windows on a screen, at least one window displaying a page of information, and processes one or more objects on each page, comprising:

means for pasting one or more tag windows at any location of each page;

means for registering one or more items of supplemental information, supplemental to information contained on a page, in said tag window pasted by said pasting means;

means for linking said page to said one or more tag windows pasted on said page or unlinking said page from said one or more tag windows depending on the location of said pasted tag window;

an input means for receiving input data from an input device;

an input data processing means for identifying whether the input data concerns said tag window or a book composed of two or more pages;

a tag processing means for setting said tag window, registering one or more items in said tag window, and linking said tag window to said page if said input data processing means determines that said input data concerns said tag window;

a book means for registering one or more objects in said book, processing a page, turning over the pages composing said book, and retrieving a target page;

a linkage information registering means for registering linkage information about a relation between a tag and a tag-pasted page in a linkage information storing means;

a linkage information calling means for calling linkage information between the tag and the tag-pasted page from the linkage information storing means;

the linkage information storing means for storing said linkage information;

an output control means for controlling an image output on screen; and a display means for selectively displaying pages and tag windows on screen.

4. An information processing apparatus according to claim 3, wherein said input means and tag processing means composes said pasting means, said tag processing means composes said registering means, and said linking means composes said tag processing means, linkage information registering means, and linkage information storing means.

5. An information processing apparatus which opens two or more windows on a screen, at least one window displaying a page of information from a book and processes one or more objects on each page, comprising:

means for pasting one or more tag windows at any location of each page;

means for registering one or more items of supplemental information, supplemental to information contained on a page, in said tag window pasted by said pasting means;

means for linking said page to said one or more tag windows pasted by said pasting means; and means for displaying only a non-overlapped portion of said tag window linked to said page if said linked page is partially hidden under another page of the book.

6. An information processing apparatus according to claim 5, comprising:

an input means for receiving input data from an input device;

an input data processing means for identifying whether the input data concerns said tag window or a book composed of two or more pages;

a tag processing means for setting said tag window, registering one or more items in said tag window, and linking said tag window to said page if said input data processing means determines that said input data concerns said tag window;

a book means for registering one or more objects in said book, processing a page, turning over the pages composing said book, and retrieving a target page;

a linkage information registering means for registering linkage information about a relation between a tag and a tag-pasted page in a linkage information storing means, a linkage information calling means for calling linkage information between the tag and the tag-pasted page from the linkage information storing unit;

the linkage information storing means for storing said linkage information, an output control means for controlling an image output on screen; and a display means for selectively displaying pages and tag windows on screen.

7. An information processing apparatus according to claim 6, wherein said input means and tag processing means composes said pasting means, said tag processing means composes said registering means, said linking means composes said tag processing means, linkage information registering means, and linkage information storing means, and said means for displaying only a non-overlapping portion composes said book processing means and said display means.

* * * * *